Patented Feb. 10, 1942

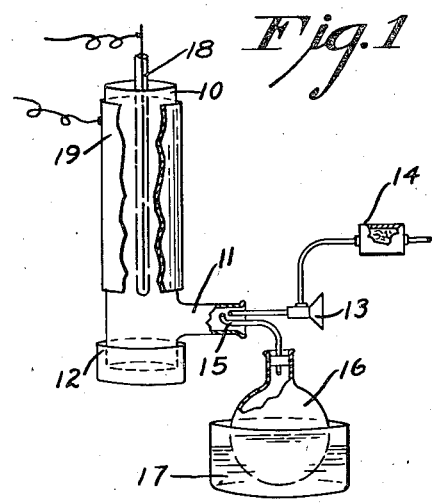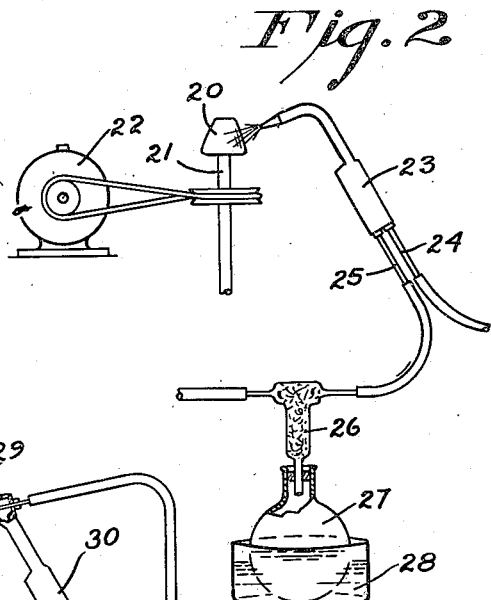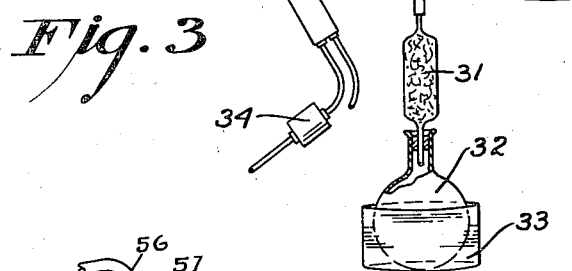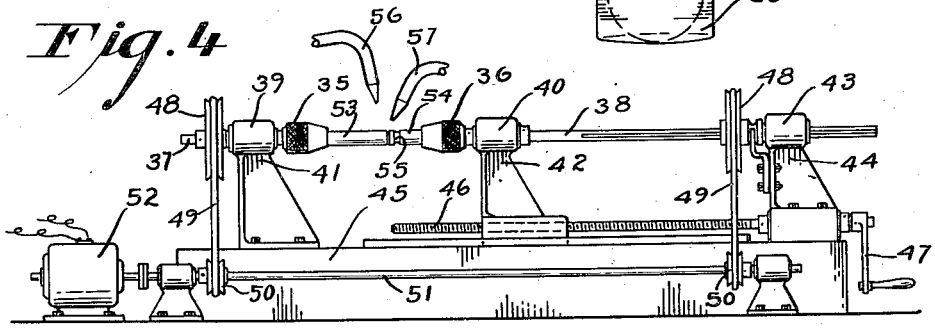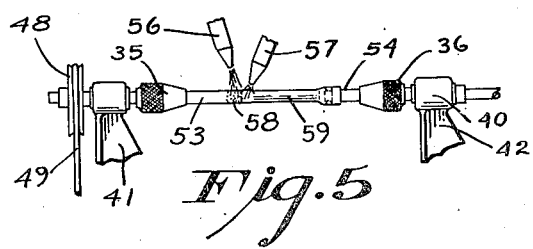

2,272,342

UNITED STATES PATENT OFFICE 2,272,342

METHOD OF MAKING A TRANSPARENT ARTICLE OF SILICA

James Franklin Hyde, Corning, N. Y., assignor to Corning Glass Works, Corning, N. Y., a corporation of New York Application August 27, 1934, Serial No. 741,709

12 Claims. (Cl. 49—78.1)

The object of this invention is the production of articles containing vitreous silica at relatively low temperatures and, if desired, of a high degree of purity. It is based on the discovery by me that the silica, which is deposited when the vapor of a hydrolyzable compound of silicon is decomposed in the presence of heat and water vapor, is of such a nature that it is readily vitrified at comparatively low temperatures. The silica so produced I propose to vitrify or to use as a means of bonding other materials such as sand, alumina, mullite, etc. In the case where the silica powder is used as a bond, it reacts with the other ingredients at a comparatively low temperature. In case it is desired to make the article entirely from the powdered silica, such powder has the important advantage of extreme purity and low vitrifying point so that a clear mass of silica may be produced at a relatively low temperature.

With these objects in view, the invention consists in a new and improved process for obtaining the silicon dioxide and in using the same in the production of the desired articles.

In the drawing which illustrates one embodiment of my invention:

Fig. 1 is a side view, partly in section, of an apparatus for making finely comminuted silica in accordance with my invention.

Fig. 2 is a side view of an apparatus for forming articles of transparent silica glass in accordance with my invention.

Fig. 3 is a side view, partly in section, of a modified burner for making and depositing silica in accordance with my invention.

Fig. 4 is a side view of an apparatus for producing transparent silica tubing in accordance with my invention; and Fig. 5 is a side view of a portion of the tube forming apparatus showing the operation thereof.

In Fig. 1, a vertically disposed tube 10 of acid resisting material, such as glass and having any convenient diameter—say three or four inches— is provided at its lower end with a side arm 11 and with a receptacle 12 for collecting dust. At the outer end of the side arm 11 a burner 13 is located in such manner that the flame of the burner extends into the side arm. The burner is fed with gas which passes through a filter 14 which is filled with glass wool and serves to separate any foreign matter, such as scale that might be in the gas stream. In front of the burner tip is placed a jet 15 of silica glass or other high melting material so that vapors issuing from the jet will instantly be mixed with the flame of the burner. The jet 15 serves as the delivery tube of a flask 16 which contains the salt to be vaporized and which is gently heated by suitable means such as a water bath 17. Extending downwardly through the open upper end of the tube 10 is a glass enclosed electrode 18 which is connected to one terminal of a high voltage A. C. rectifier (not shown), the other terminal of which is connected to an electrode 19 wrapped around the outside of the tube 10. The electrodes, carrying a voltage of about 20,000 volts D. C., constitute an electrical precipitator of the Cottrell type.

In Fig. 2 a refractory form or core 20, composed of porcelain or other refractory material and having any desired shape, is mounted on a spindle 21 which is rotated by a motor 22. A high temperature burner 23 is held by hand in such a position that its flame impinges on the rotating core 20. The burner, which may be of the conventional type known as an oxyhydrogen torch, is provided with a tube 24 for supplying oxygen to the burner and a tube 25 for supplying a combustible gas thereto. Between the tube 24 and the gas supply is located a filter tower 26 comprising a vertical glass tube filled with glass wool and joined at its lower end by an air tight joint to the neck of a flask 27, which contains a hydrolyzable compound of silica, such as silicon tetrachloride, and which is heated by a water bath 28.

An alternative method of introducing the silicon salt vapor into a high temperature burner is illustrated in Fig. 3 wherein a small tube 29 is inserted through the neck of a burner 30 so that the tip of the tube 29 is at the mouth of the burner and vapor from the tube 29 will be projected into the cone of its flame. The projecting outer end of the tube 29 is connected by rubber tubing to a filter tower 31 which contains glass wool and which is joined by an air tight joint to a flask 32 containing a hydrolyzable compound of silicon and heated by a water bath 33. A filter 34 is inserted in the gas line.

In Fig. 4 a pair of opposed chucks 35 and 36 are mounted on shafts 37 and 38 which pass through bearings 39 and 40 and are supported by a head stock 41 and a tail stock 42, and the shaft 38 being longitudinally fixed in the bearing 40 and slidably supported by a bearing 43 in a secondary tail stock 44. The head stock 41 and the secondary tail stock 44 are bolted to a lathe bed 45 while the tail stock 42 is slidably engaged with the lathe bed and is adapted to be moved longitudinally thereof with the shaft 38 by means of a screw 46 which passes through the bases of the tail stock 42 and the secondary tail stock 44, said screw having a crank 47 at its outer end for turning it. Keyed to the shafts 37 and 38 are pulleys 48, the shaft 38 being adapted to slide through its pulley. The pulleys 48 are driven by belts 49 and by pulleys 50 which are attached to a counter shaft 51. A driving motor 52 is connected to one end of the counter shaft 51. In the chucks 35 and 36 are placed cylindrical mandrels 53 and 54 respectively, the mandrel 53 preferably being composed of a non-scaling metal of high melting point such as nickel, and the mandrel 54 being composed of like material or of fused silica. In case the mandrel 54 is composed of metal, its outer end is provided with an annular notch 55, or it may be flared in lieu thereof. The mandrels butt together and above them are placed a depositing burner 56 and a vitrifying burner 57 of the oxyhydrogen type, the burners being held in a fixed position by adjustable means (not shown) so that the flames thereof impinge on the abutted ends of the mandrels. The depositing burner 56 is supplied with vapor of a hydrolyzable silicon compound in the manner illustrated in either Fig. 2 or Fig. 3.

In Fig. 5 a coherent layer 58 of amorphous silica, which is deposited by the burner 56 on the mandrel 53, is vitrified by the burner 57 to a transparent tube 59 of silica glass which is attached to the mandrel 54. The mandrel 54 is moved away from the mandrel 53 as the tube is formed.

In practicing my invention I place in the flask a quantity of a hydrolyzable compound of silicon, for example, silicon chloride, silicochloroform, methyl silicate, ethyl silicate, etc., or mixtures thereof, and heat it sufficiently by means of the water bath 17 to cause vaporization. Silicon fluoride may also be used, as will later appear. The vapor issuing from the jet 15 is instantly hydrolyzed by the water vapor in the flame of the burner 13 and the resulting amorphous oxide passes as a smoke through the side arm 11 into the tube 10 where it is collected in the receptacle 12.

Although I can form the silica powder successfully with an ordinary flame, such as that of a Bunsen burner, I prefer to use a flame of combustible gas combined with oxygen, since this develops a higher temperature and produces a more dense silica. Furthermore, the use of a high temperature burner is particularly advantageous for depositing the silica on a shaped refractory form and sintering it to a clear transparent glass in situ.

The silica thus prepared may, under proper conditions, be vitrified to a transparent glass at temperatures below the melting point of silica. For example, a quantity of the silica powder is compressed dry under high pressure, say 10,000 pounds per square inch, into a desired shape such as a plate, and the compressed article is then heated in an electric muffle or the like for a time and at a temperature sufficient to convert it to a vitreous transparent body. Vitrification will take place at temperatures as low as 1200° C. in about one to three hours. At higher temperatures vitrification proceeds more rapidly and at 1350° C. vitrification will be complete in about twenty minutes. There is considerable shrinkage on vitrifying especially in the case of silica which was made with a Bunsen flame, but when a high temperature burner such as that illustrated in Fig. 2 or Fig. 3 is substituted in lieu of the Bunsen burner of Fig. 1, the resulting soot will not shrink excessively when compressed and vitrified. The compressed article preferably is preheated at a temperature of 100 to 500° C. for a few minutes to expel air from the pores and to prevent the spalling which may occur when the compressed article is suddenly raised to a high temperature.

It is believed that the inclusion of minute traces of impurities, such as metal oxides or salts into the silica during its formation, will cause crystallization or transformation of some of the amorphous silica into a crystalline variety of silica during the vitrifying step. Therefore care must be exercised to prevent the inclusion of such impurities by using apparatus which is constructed insofar as possible of acid resistant material such as glass, by filtering the gases to remove scale and other foreign matter, and either by using burner tips of special metal, such as platinum, or by keeping the burner tip out of the acid fumes which are evolved during hydrolysis. Moreover, an intangible but detrimental contamination is imparted to the silica powder by the hands and the powder should be handled only with clean implements. Silicon chloride of technical grade evidently does not contain metal impurities which are volatile at the temperature employed for the vaporization thereof and is suitable for producing pure silica powder. By observing the above-mentioned precautions, I have produced silica which will vitrify to a transparent glass at relatively low temperatures and which is of such a high degree of purity that it contains not more than .001% of non-volatile residue after evaporation with hydrofluoric acid in the manner customary for making such determinations.

Articles of transparent vitreous silica may also be produced in accordance with my invention by depositing the silica in a layer on a refractory core having the shape of the desired article, as illustrated in Fig. 2, and then vitrifying the shaped layer. In this case the silica is formed preferably by means of the high temperature burner 23, the silicon salt vapor being introduced into the burner with a combustible gas through the filter tower 26 and the tube 25 by warming the flask 27, or it may be introduced directly into the flame through the auxiliary jet 29, Fig. 3. The burner 23 or 30 is adjusted to give a sharp flame and is held so that the flame impinges on the rotating core 20. A dense coherent layer of silica powder is rapidly deposited on the core 20 and is spread evenly over it by moving the flame up and down to treat its entire area. Although it is possible to vitrify the deposited silica to transparent vitreous silica by means of the flame as rapidly as it is deposited, I prefer to make the shaped layer by holding the flame far enough away from the core 20 to avoid vitrification until the coherent layer is sufficiently thick, from 2 mm. to 5 mm., and then removing the shaped layer and vitrifying it in a muffle at 1000° C. to 1400° C.

For making large masses of fused silica, such as lenses, prisms, and the like, I prefer to use hydrogen as the combustible gas and to vitrify the silica as it is deposited, either by means of the depositing flame or by means of an auxiliary flame impinging simultaneously on the same spot.

In making transparent silica tubing by means of the apparatus shown in Figs. 4 and 5, I bring the adjacent ends of the mandrels 53 and 54 into abutting relation and, having set the shafts 37 and 38 in rotation by means of the motor 52, I deposit a dense coherent layer of amorphous silica over the adjacent abutted ends of the mandrels by means of the burner 56. That portion of the layer of silica which covers the notched end of the mandrel 54 is then vitrified by means of the burner 57 and forms the end of a silica glass tube 59 which is attached to the end of the mandrel 54 and engages the notch 55. The depositing burner 56 is then adjusted and fixed to impinge on the outer end of the mandrel 53 and to deposit continuously thereon the amorphous silica layer 58 as a continuation of the tube 59. At the same time the mandrel 54 is steadily moved longitudinally away from the mandrel 53 by means of the crank 47 and the vitreous silica tube 59, together with the continuing amorphous tube 58, is carried along with it, the amorphous tube 58 being only slidably supported by the mandrel 53. The vitrifying burner 57 is adjusted and fixed to impinge on the amorphous silica tube at the point where it joins the vitreous silica tube and somewhat beyond the end of the mandrel 53. In this manner the amorphous silica is continuously deposited in the form of a tube on the mandrel 53 and is continuously withdrawn therefrom being at the same time continuously vitrified to a transparent tube of silica glass at a relatively low temperature. In lieu of the notched mandrel 54, a rod or tube of fused silica may be used to which is fused the vitreous tube 59. Furthermore, if desired, the shaft 38 may be hollow and the hole therein may be adapted to communicate with the interior of the tube 59 whereby a continuous air pressure may be introduced within the tube 59 to maintain a uniform bore therein.

When a tube of sufficient length has been produced, the burners 56 and 57 are turned off and the tube is cooled and severed from the mandrel 54 in the usual manner.

It will be obvious to any skilled mechanic that instead of being drawn horizontally, as shown, the tube may be drawn vertically or at an angle upwards or downwards by suitably altering the apparatus. Moreover, instead of the separable mandrels 53 and 54, one long mandrel may be employed and the silica tube may continuously be deposited and vitrified thereon without being withdrawn therefrom either by moving the mandrel past the burners or by moving the burners in spaced relation longitudinally of the mandrel, all of which lies within the scope of my invention.

Although silicon tetrachloride is a convenient and easily obtainable material for the preparation of silica powder in accordance with my invention, I have also used silicon fluoride with equally good results. Silicon fluoride possesses the advantage of low cost and may easily be prepared by treating pulverized sand or silicates, such as clays, waste glass, etc., with hydrofluoric acid whereupon the silicon fluoride is evolved as a gas. Although the preparation of silicon fluoride is preferably carried out in a vessel which is resistant to the action of hydrofluoric acid, such as one composed of lead, copper, brass, or platinum, the silicon fluoride as a dry gas has little if any action on glass and may be conducted into the flame in the manner illustrated in the drawing. I may also use a hydrolyzable organic compound of silicon such as ethyl, or methyl silicate, etc., these compounds being easily vaporized and introduced into the flame as shown.

The finely divided silica, which is prepared in accordance with my proposed method, as described above, is particularly useful as a bond for ceramic materials, such as alumina, mullite, silica, etc., on account of the fact that it will react as a bond at lower temperatures and in a shorter time and also will produce a more homogeneous body than would otherwise be possible. In employing my powdered silica as a bond, I mix it with the material which is to be bonded in the manner known to those who are skilled in the art and fire the body, the temperature and time required being in general less than those ordinarily employed. The amount of silica powder used for this purpose will depend largely upon the type of body desired and the amount of shrinkage which is permissible, the shrinkage increasing as the amount of silica powder, which is used, is increased. For example, in producing an alumina refractory body of high fusion point and low porosity, I use a relatively small amount of silica powder, say from 1% to 10%.

I have also produced porous bodies of my pure silica powder, which have a definite and predetermined pore size and which are suitable for filter mediums. In doing this, I preferably compress the silica powder to the desired form and heat it to a temperature of 1000°–1200° C. for a length of time which is sufficient to cause shrinkage and bonding but which is insufficient to cause vitrification. The porosity, that is the pore size, decreases as the time of heating is increased, the length of time required for a given porosity being readily determinable by trial.

Mullite and silica may be bonded in the same manner as alumina.

While in the foregoing there has been shown and described the preferred embodiment of my invention, it is to be understood that minor changes in the details of construction, combination, and arrangement of parts may be resorted to without departing from the spirit and scope of the invention as claimed.

I claim:

1. The method of making a transparent article of silica, which includes vaporizing a hydrolyzable compound of silicon into a flame of combustible gas to decompose the vapor and to form finely comminuted silica, and vitrifying the silica to a transparent body.

2. The method of making a transparent article of silica, which includes vaporizing a hydrolyzable compound of silicon into a flame of combustible gas to decompose the vapor and to form finely comminuted silica, and vitrifying the silica to a transparent body at a temperature of from 1000° C. to 1400° C.

3. The method of making a transparent article of silica, which includes vaporizing a hydrolyzable compound of silicon into a flame of combustible gas, impinging the flame on a refractory core to deposit thereon a layer of silica in the shape of the desired article and vitrifying the layer to a transparent article.

4. The method of making a transparent article of silica, which includes vaporizing a hydrolyzable compound of silicon into a flame of combustible gas, impinging the flame on a refractory core to deposit thereon a layer of silica in the shape of the desired article and vitrifying the layer to a transparent article at a temperature of from 1000° C. to 1400° C.

5. The method of making a transparent article of silica, which includes vaporizing a hydrolyzable compound of silicon into a high temperature flame of combustible gas combined with oxygen, impinging the flame on a refractory core to deposit thereon a layer of silica in the shape of the desired article, and vitrifying the layer to a transparent article at a temperature of from 1000° C. to 1400° C.

6. The method of making a transparent article of silica, which includes vaporizing a hydrolyzable compound of silicon into a high temperature flame of combustible gas combined with oxygen, impinging the flame on a refractory core to deposit thereon a coherent layer of amorphous silica in the shape of the desired article, removing the shaped coherent layer and vitrifying it to a transparent article.

7. The method of making a transparent article of silica, which includes vaporizing a hydrolyzable compound of silicon into a high temperature flame of combustible gas combined with oxygen, impinging the flame on a refractory core to deposit thereon a coherent layer of amorphous silica in the shape of the desired article, removing the shaped coherent layer and vitrifying it to a transparent article at a temperature of from 1000° C. to 1400° C.

8. The method of making a transparent article of silica, which includes vaporizing a hydrolyzable compound of silicon into a high temperature flame of combustible gas combined with oxygen, impinging the flame on a refractory core to deposit thereon a layer of silica and vitrifying the deposited silica as fast as it is deposited by holding a flame sufficiently close to the layer to cause it to become heated locally to a temperature of 1200° C. to 1400° C.

9. The method of making transparent silica tubing, which includes vaporizing a hydrolyzable compound of silicon into a flame of combustible gas combined with oxygen, impinging the flame on a rotating refractory mandrel to deposit thereon a coherent layer of amorphous silica, vitrifying the layer with a flame and withdrawing the vitrified layer from the mandrel.

10. The method of making transparent silica tubing, which includes vaporizing a hydrolyzable compound of silicon into a flame of combustible gas combined with oxygen, impinging the flame on a rotating refractory mandrel to deposit continuously thereon a coherent layer of amorphous silica, continuously withdrawing the layer of silica from the mandrel and continuously vitrifying it with another flame as it is being withdrawn.

11. The method of making a transparent article of silica which includes vaporizing an hydrolyzable compound of silicon, forming finely comminuted silica by the decomposition of such vapor in a flame, collecting the said silica on a support and vitrifying the silica while on the support to a transparent body.

12. The method of making a transparent article of silica which includes vaporizing an hydrolyzable compound of silicon, decomposing the vapor in a flame to form finely comminuted amorphous silica, converting such amorphous silica into vitreous silica as formed and depositing the vitreous silica on a support.

JAMES FRANKLIN HYDE.